United States Patent Office 3,435,618
Patented Apr. 1, 1969

3,435,618
CONTROLLED DISSOLUTION OF FLOCCULANTS
Melvin F. Katzer, Danville, Calif., assignor to The Dow Chemical Company, Midland, Mich., a corporation of Delaware
No Drawing. Filed Oct. 7, 1966, Ser. No. 584,991
Int. Cl. E02b *13/00;* C08f *45/04*
U.S. Cl. 61—1                             5 Claims

ABSTRACT OF THE DISCLOSURE

Shaped articles composed of water-soluble polyelectrolytes and a water-soluble solid matrix of wax is employed to administer the polyelectrolytes to aqueous dispersions. The rate at which such a solid article dissolves in a body of water is modified by the incorporation of a simple water-soluble electrolyte, such as sodium chloride. The technique is particularly effective for introducing flocculant grade polyelectrolytes into a flowing stream of water.

---

The present invention concerns a novel technique for introducing high molecular weight, water-soluble polyelectrolytes into aqueous systems. For instance, a method is provided for introducing polymeric flocculants into aqueous suspensions to be flocculated.

The term "polyelectrolyte" as employed herein refers to polymers which have a plurality of hydrophilic groups along or in the polymeric backbone sufficient to render the resulting polymer water-soluble. Many of the described polyelectrolytes, especially those of higher molecular weights, will be recognized as efficient flocculants. As used herein "high molecular weight" encompasses weight average molecular weights of at least about 0.5 million up to as much as 15 million or more.

There are many applications for the use of flocculant grade polyelectrolytes in which it is impossible or inconvenient to employ conventional polymer dispersing or metering means. It is well known that such polymers, being readily water soluble, tend to agglomerate when wetted with water making difficultly soluble gels which are lost to the desired function of the polyelectrolyte. This problem becomes progressively worse as the particle size decreases.

An illustration of the application of flocculants wherein it is inconvenient, and generally economically impossible, to provide mechanical dispersers or metering equipment for the flocculants involves their use in irrigation canals to promote water penetration into the soil. This must be a carefully controlled addition of the flocculant inasmuch as too much, i.e. an excess of 10 p.p.m. or so, will tend to produce the reverse of the desired effect. That is, too much of the flocculant will have a tendency to flocculate suspended particles in the irrigation water and thus blind the surface of the soil to be irrigated. On the other hand, a very small amount of the flocculant will not flocculate the solids but it will have a beneficial effect in increasing the rate and depth of water penetration thus promoting shorter irrigation periods and more efficient use of the water.

In view of the above, it is an object of the present invention to provide a novel technique for administering controlled amounts of polyelectrolytes to aqueous systems. It is also an object to provide a formulation, and an article of manufacture, which obviates the need for mechanical aids in dispersing or metering the polyelectrolyte. Further objects are to provide methods for adding a flocculant to irrigation streams, stock ponds, lakes and rivers, especially whenever a small amount of flocculant is needed. These objects, and other benefits as will become apparent hereinafter, are accomplished in the present invention.

According to the invention, a water-soluble polyelectrolyte is blended with a matrix-wax material, as hereinafter characterized, and molded to provide a solid article which sustains a slow release of the polyelectrolyte when in contact with a body of water. The matrix-wax material is a thermoplastic, water-soluble wax solid at about 100° F. Such a wax should have a melting point of a moderately low temperature such as for example below about 200° F. Preferably it has a melting point within the range from about 100 to about 200° F. For the purposes of the invention, it is water-soluble if it will dissolve in water at 20° C. to the extent of about 0.1 percent.

Suitable matrix-wax materials include polyethylene oxides, copolymers of ethylene and propylene oxides, polyvinyl alcohols, linear, thermoplastic polyesters, e.g. reaction products of ethylene glycol and phthalic anhydride with an excess of either the acid or glycol, and simple molecular compounds such as hexanol, acetophenone, benzoic acid, caproic acid, benzyl alcohol, and the like.

In preparing the above solid articles of polyelectrolytes and a matrix-wax material, 1 part of the water-soluble, polyelectrolyte is mixed with from about 0.5 to about 2 parts, preferably from about 1 to about 1.5 parts, by weight, of the water-soluble wax. Preferably, the wax is already in a molten condition prior to blending with the polyelectrolyte. However, if desired, the wax and polyelectrolyte can be blended as solids and the resulting mixture heated to provide a molten mass which can be cast into a desired shape. Alternately, the polymer and wax can be dry blended and the resulting mixture shaped in a pressure mold to form coherent articles.

To lower the melting point, or flowability under pressure, of a particular matrix wax, it may be desirable to incorporate a small amount of a solvent into the wax. Any liquid organic material which is compatible with the wax may be used for this purpose. For instance, suitable liquid materials include methanol, ethanol, propanol, propylene glycol, and dimethyl formamide.

Water-soluble polyelectrolytes, especially those of flocculant grade, useful in the invention are known to the art. Such polymers are illustrated in U.S. Patents 3,170,814 and 3,171,800. In general, such polymers of flocculant grade are high molecular polyalkanes, i.e. obtained by the polymerization of monoethylenically unsaturated monomers of which a sufficient proportion is constituted by monomers having a hydrophilic substituent in the form of the carboxylic group, carboxamide group, or sulfonate group to form a water-soluble polymer. Carboxylic groups include for example, alkali metal carboxylates, aminoalkyl esters such as aminoethyl acrylate, dimethylaminoethyl acrylate, and quaternary ammoniumethyl acrylate. Carboxamide groups include the simple amides as well as the n-alkyl and amino-alkyl substituted amides including in the latter instances, N-ethyl acrylamide, N-propyl acrylamide, N-aminopropyl acrylamide, N-dimethylaminopropyl acrylamide, and N-quaternary ammoniumethyl acrylamide. The sulfonic group is preferably an alkali metal or ammonium sulfonate.

In the preferred embodiment of the invention, water-soluble acrylamide polymers are used. Such polymers are obtained by the homo-or copolymerization of acrylamide or methacrylamide including the N-substituted derivatives thereof as described above.

In a further embodiment of the invention, it has been discovered that incorporating a simple water-soluble electrolyte, preferably in the form of a water-soluble, alkali metal or ammonium salt of an inorganic mineral acid increases, in proportion to the amount of simple electrolyte added, the solution rate of the molded polyelectrolyte compositions. Depending upon the desired rate of dissolution, the amount of inorganic electrolyte will vary from 0 up to as much as about 90 percent by weight of the total blended composition. Preferably, however, the amount of salt employed does not exceed about 50 percent by weight of the total composition.

Suitable simple inorganic electrolytes used for this purpose include the water-soluble alkali metal and ammonium salts of hydrochloric and sulfuric acids.

In a particular embodiment of the invention, a water-soluble, thermoplastic polyalkylene oxide polymer is employed as the matrix wax material. The oxide polymer selected has a melting point within the range from about 100° F. up to about 133° F. and is infinitely soluble in water. The solid fluocculant article is formed from one part by weight of the polyalkylene oxide polymer which is heated above its melting point and mixed with from about 2 up to about 4 parts by weight of a polyelectrolyte in the form of a water-soluble high molecular weight acrylamide polymer. Also incorporated into the molten material is an amount, effective to adjust the dissolution rate of the molded composition to a desired level, of an alkali metal chloride such as sodium chloride.

To determine the exact amount of salt required to give a desired controlled dissolution rate, several discs of a given surface area are molded from the composition containing incremental increases of a simple inorganic salt. The solution rate of such discs is determined in an aqueous system under conditions of agitation comparable to those under which the molded flocculant article will be used. That is, if the method of dispersing the flocculant will involve putting the molded flocculant article in a pond or lake, the rate of flocculant release will be evaluated under static conditions. Under these conditions, diffusion of the flocculant into adjacent water can be a controlling parameter. On the other hand, if the flocculant article is to be employed in a moving stream, diffusion is no longer a controlling parameter in the dissolution rate and the experimental solution rate must be evaluated in a flowing aqueous stream.

By preparing a solution rate curve for a given polyelectrolyte-matrix wax composition as a function of increasing inorganic salt content, it is possible to predetermine the composition of a flocculant article having any desired sustained release rate. With advance knowledge of the sustained release rate of the polymeric flocculant from the molded article, an irrigation water stream of known flow rate can be dosed with a desired amount of polymeric flocculant over an extended period of time for as much as several days, depending upon the size of the flocculant article.

Manifestly, if a uniform sustained release is desired, the flocculant article should be designed such that the total surface area presented to the aqueous system does not change appreciably as it dissolves. One form generally suitable for this purpose is the disc shape. It will be apparent to those skilled in the art, that other shapes may be adopted to provide dissolution rates which are substantially linear as a function of time. It should be understood, however, that the invention also contemplates the preparation of articles wherein the surface area at which dissolution occurs may be adjusted according to any desired function of time by appropriate design of the molded flocculant article.

The invention will be more fully illustrated by reference to the following examples.

EXAMPLE 1

A series of molded flocculant articles in the form of cylinders 2.5 inches long and ¾ inch in diameter were cast, as a hot slurry, from mixtures of polyelectrolyte, matrix wax and sodium chloride. The polymer employed was a polyacrylamide in which about 30 percent of the initially available carboxamide groups had been hydrolyzed to sodium carboxylate groups. The polymer was characterized by a weight average molecular weight of at least 2 million. The matrix-wax was an ethylene oxide polymer having an average molecular weight of about 4000. It was melted and the polymer was slurried into the melt to provide a homogeneous composition.

To different aliquots of the polymer and molten polyethylene oxide were added increasing increments of sodium chloride. The resulting formulations were then cast in suitable molds to provide shaped articles of the above indicated size. The resulting solid molded articles were placed inside a 1.5 inch glass pipe and water was passed over them at a rate of about 4 gallons per minute. The time for an article to dissolve was thus determined. The results of these experiments showing the effect of increasing salt content in reducing the length of time required for dissolution are set forth in the following table.

TABLE I

| Composition [1] | | Time for dissolution of article (hours) | Polymer solution rate (hours/lb.) |
|---|---|---|---|
| Percent acrylamide polymer | Percent NaCl | | |
| 100 | None | 72 | 72 |
| 50 | 50 | 10 | 20 |
| 33 | 67 | 6 | 18 |
| 25 | 75 | 3 | 12 |

[1] Exclusive of polyethylene glycol wax. Sufficient polyethylene oxide wax was added to make a homogeneous slurry.

EXAMPLE 2

In a manner similar to that of Example 1, two formulations were prepared from the polyethylene oxide and polyacrylamide. The two formulations were characterized respectively, by a 1:1 and a 3:2 ratio of polyethylene oxide to polyelectrolyte. 30 grams of the first formulation had a dissolving time of 3.33 hours while an equal aliquot of the second formulation had a dissolving time of 2.25 hours. This data illustrates that significantly increasing amounts of water-soluble matrix-wax solids increases the rate of solution.

In a manner similar to the foregoing, high molecular weight, water-soluble polystyrene sulfonate, sodium polyacrylate, polyaminoethylacrylate, poly-n-aminopropyl acrylamide and poly-n-vinyl pyridine are substituted for the above polyacrylamide to achieve similar results. Similarly, other wax-matrix solids such as water-soluble polyvinyl alcohol and water-soluble thermoplastic polyesters such as the reaction products of ethylene glycol and phthalic acid can be substituted for the ethylene oxide polymer to prepare useful solid flocculant articles. Salts which have been employed successfully to control the rate of dissolution include ammonium chloride, ammonium phosphate, ammonium nitrate, ammonium sulfate, and potassium chloride.

What is claimed is:

1. A method for introducing a polyelectrolyte flocculant into an aqueous system which comprises contacting the aqueous system with a shaped article of a composition of mater comprising 1 part by weight of a water-soluble polyelectrolyte and from about 0.5 to about 2 parts by weight of a water-soluble solid matrix wax.

2. A method as in claim 1 wherein the shaped article is of a composition comprising, in addition to the specified components, from about 0 up to about 90 percent based on the weight of the total composition of a simple water-soluble electrolyte.

3. A method as in claim 1 wherein the aqueous system contacted is a flowing stream of water and the additional step of irrigating soil with the resulting water.

4. A method as in claim 2 wherein the aqueous system contacted is a flowing stream of water and the additional step of irrigating soil with the resulting water.

5. A method as in claim 4 wherein the polyelectrolyte is a high molecular weight, water-soluble polyacrylamide and the matrix wax is a water-soluble, thermoplastic polyalkylene oxide.

References Cited

UNITED STATES PATENTS

| | | | |
|---|---|---|---|
| 2,169,366 | 8/1939 | Meigs | 260—28 |
| 2,232,595 | 2/1941 | Dittmar et al. | 260—28 |
| 2,273,780 | 2/1942 | Dittmar | 260—28 |
| 3,108,441 | 10/1963 | Watson | 61—36 |
| 3,252,290 | 5/1966 | Gagle et al. | 61—36 |

JACOB SHAPIRO, *Primary Examiner.*

U.S. Cl. X.R.

61—12, 36; 106—28; 260—270